United States Patent [19]

Roper

[11] Patent Number: 4,462,272

[45] Date of Patent: Jul. 31, 1984

[54] LIMITED SLIP DIFFERENTIAL

[75] Inventor: Daniel W. Roper, Rochester, Mich.

[73] Assignee: Rockwell International Corporation, Pittsburgh, Pa.

[21] Appl. No.: 294,260

[22] Filed: Aug. 19, 1981

[51] Int. Cl.³ .......................... F16H 1/44; F16D 7/00; F16D 19/00; F16D 23/10
[52] U.S. Cl. ........................................ 74/711; 192/54; 192/93 A; 192/103 C
[58] Field of Search ...................... 74/711, 710.5, 650; 192/54, 93 A, 35, 103 C

[56] References Cited

U.S. PATENT DOCUMENTS

| | | | |
|---|---|---|---|
| 1,823,092 | 9/1931 | Lavaud | 74/650 |
| 2,234,591 | 3/1941 | Fitzner | 74/711 |
| 2,827,944 | 3/1958 | Tiedeman et al. | 192/93 A |
| 2,933,171 | 4/1960 | Kraeplin | 192/35 |
| 3,055,234 | 9/1962 | O'Brien | 74/711 |
| 3,330,169 | 7/1967 | Carrico et al. | 74/711 |
| 3,369,428 | 10/1965 | Hughson | 74/710.5 |
| 3,404,585 | 10/1968 | Roper | 74/711 |
| 3,572,165 | 3/1971 | Roper | 74/711 |
| 3,606,803 | 9/1971 | Otteman | 74/711 |
| 3,657,935 | 4/1972 | O'Brien | 74/711 |
| 3,762,241 | 10/1973 | Roper | 74/711 |
| 3,811,341 | 5/1974 | Goscenski, Jr. | 74/711 |
| 3,818,781 | 6/1974 | Goscenski, Jr. | 74/711 |
| 3,886,813 | 6/1975 | Baremor | 74/711 |
| 4,059,026 | 11/1977 | Stritzel | 74/711 |
| 4,205,509 | 6/1980 | Miyazawa et al. | 192/93 A X |
| 4,249,429 | 2/1981 | Denning | 74/711 |

Primary Examiner—Allan D. Herrmann
Assistant Examiner—Stephen B. Andrews

[57] ABSTRACT

A limited slip differential includes a rotatably mounted differential casing with a pair of side gears rotatably mounted therein. One of the side gears includes an annular clutch plate having a frusto-conical clutch surface. A clutch ring is generally mounted for rotation with the differential casing and is capable of axial movement between a biased non-engaged position and an engaged position against biasing wherein a mating surface thereon is brought into contact with the frusto-conical clutch surface of the clutch plate. An inertial ring is mounted for rotation with the differential casing but is capable of circumferential movement relative thereto between a neutral position and an actuated position. When either of the side gears experiences a slipped condition, it rapidly accelerates to cause the differential casing to exceed a predetermined rate of acceleration. The inertial ring has sufficient mass to resist the acceleration of the differential casing to cause it to be moved from the neutral to the actuated position. A thrust pin is aligned with a cam surface on the inertial ring to cause it to be moved axially when the inertial ring is in the actuated position so that the other end of the thrust pin will move the clutch ring to the engaged position. When the clutch ring is in the engaged position, frictional contact between the clutch ring and the clutch plate will cause the clutch ring to be rotated with the side gear. As the clutch ring tries to rotate with the side gear, camming surfaces on the clutch ring and the differential casing are brought into contact to prevent further relative rotation between the differential casing and the side gear until the force generated between the differential casing and the clutch ring is released.

2 Claims, 12 Drawing Figures

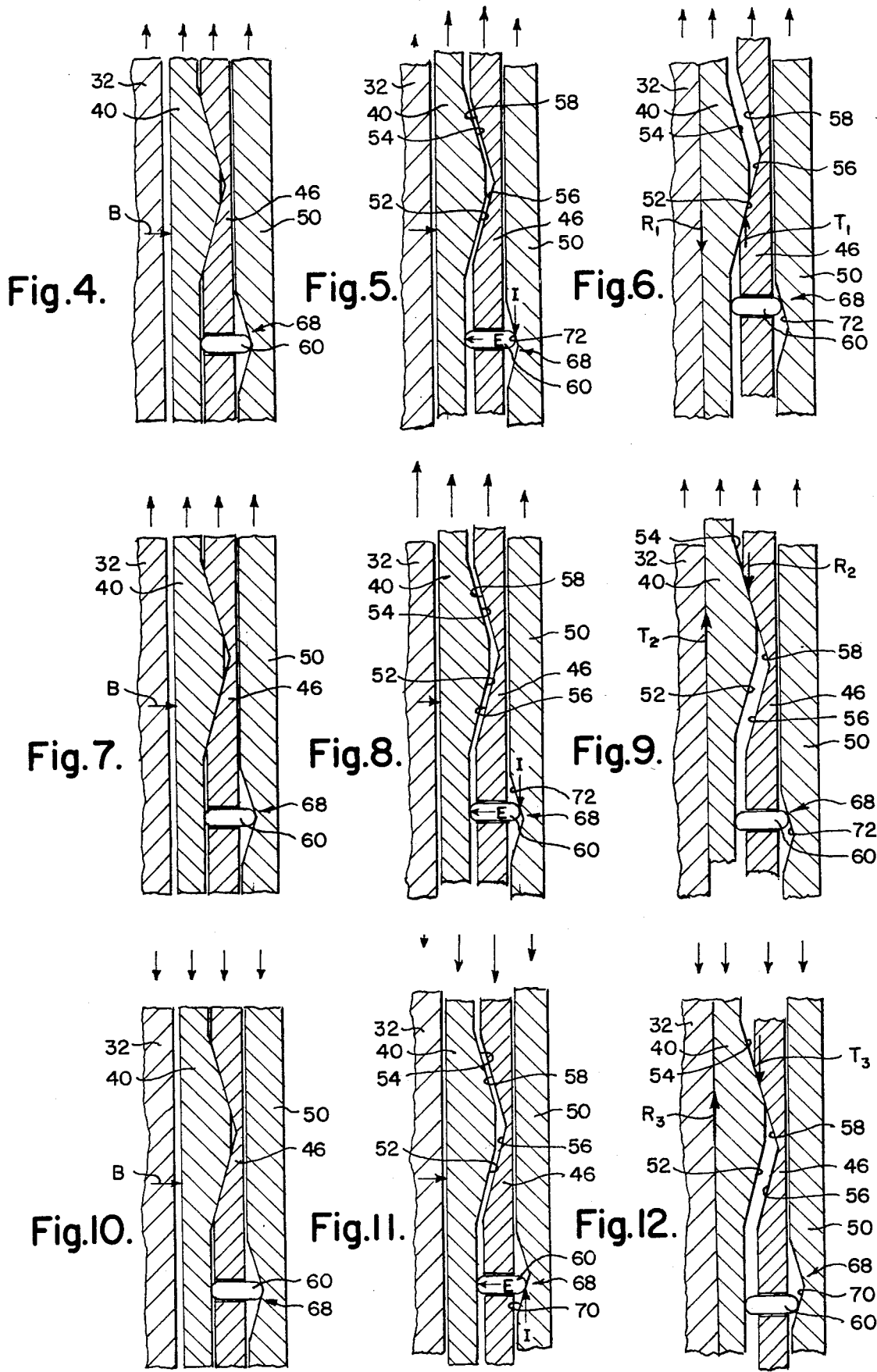

LIMITED SLIP DIFFERENTIAL

BACKGROUND OF THE INVENTION

1. Field of the Invention

This invention relates to a limited slip differential and, more specifically, to such a differential which includes an inertial ring which moves to an actuated position when the differential casing accelerates under a slipped wheel condition to initiate frictional engagement between one of the side gears and the differential casing to prevent relative rotation therebetween.

2. Description of the Prior Art

It is well known that differential mechanisms are utilized in the power transmissions of vehicles to provide for the proper handling and control of the vehicle during normal operating conditions. However, it is also well known that there are situations in which the loss of traction at one wheel of such a differential mechanism will effectively prevent the populsion of the vehicle. Therefore, it is not uncommon for some vehicles to be provided means for locking out the differential when one of the wheels is in such a spin or lost traction condition.

Although there has heretofore been provided a number of devices for preventing differentiation in this situation, such as those disclosed in U.S. Pat. Nos. 3,572,165; 3,606,803; 3,762,241; 3,811,341; 3,818,781 and 3,886,813, there remains a need for a limited slip differential which is inexpensive to provide and efficient and reliable in operation.

SUMMARY OF THE INVENTION

It is, therefore, an object of this invention to provide a limited slip differential which is capable of preventing differentiation when the differential casing exceeds a predetermined rate of acceleration when either of the side gears of the differential is caused to accelerate under a slipped condition.

It is a further object of this invention to provide such a limited slip differential which will function in either a first or a second direction of rotation of the differential casing.

These and other objects of the invention are provided in a preferred embodiment thereof in the form of a limited slip differential including a rotatably mounted differential casing, a pair of side gears rotatably mounted in the differential casing and a plurality of planetary pinions rotatably mounted on the differential casing and in meshing engagement with the side gears. A clutch ring is generally mounted for rotation with the differential casing and capable of axial movement between an engaged position toward one of the side gears to produce a braking force therebetween and a non-engaged position. There is included means for biasing the clutch ring toward the non-engaged position. An inertial ring is mounted for rotation with the differential casing and is capable of circumferential movement relative thereto between a neutral position and an actuated position. There is included means for resisting the circumferential movement of the inertial ring from the neutral position during rotation of the differential casing below a predetermined rate of acceleration thereof at least when the clutch ring is in the non-engaged position. The differential casing would exceed the predetermined rate of acceleration when either of the side gears is caused to accelerate under a slipped condition. The inertial ring includes sufficient mass resisting the acceleration of the differential casing to overcome the means for resisting the circumferential movement when the differential casing exceeds the predetermined rate of acceleration to be relocated relative thereto at the actuated position. There is means for axially moving the clutch ring to the engaged position when the inertial ring is relocated at the actuated position. The clutch ring in the engaged position produces the braking force between the clutch ring and the one side gear to cause rotation of the clutch ring with the one side gear. The clutch ring and the differential casing have camming surfaces thereon which are brought into contact by the rotation of the clutch ring with the one side gear so that the camming surfaces prevent further relative rotation of the clutch ring and the differential casing tend and to force the clutch ring toward the engaged position against the biasing as long as the thrust on the differential casing is transmitted to the one side gear through the clutch ring.

BRIEF DESCRIPTION OF THE DRAWINGS

FIGS. 4–12 are views similar to those shown in FIGS. 2 and 3 including the relative positions of the preferred elements therein under various operating conditions.

DETAILED DESCRIPTION OF THE PREFERRED EMBODIMENT

Figure 1:
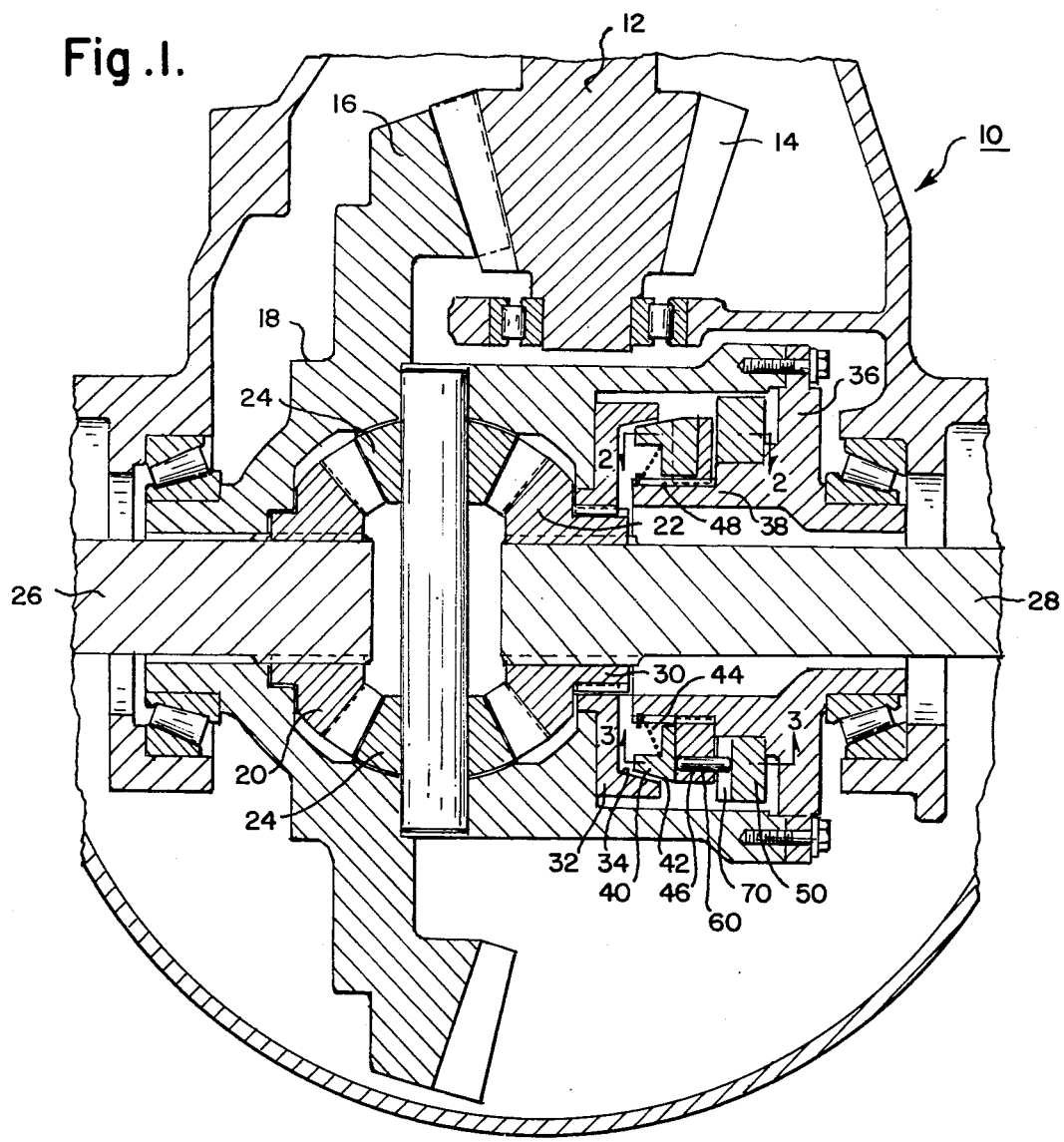
FIG. 1 is a sectional top view of the preferred limited slip differential including various features of the invention.

As seen in FIG. 1, the preferred limited slip differential 10 is in the form of a drive axle differential although it should be clear to those skilled in the art that a similar limited slip differential could be provided in an interaxle differential configuration. In the preferred differential 10, an input shaft 12 includes a drive pinion 14 which is in driving engagement with a ring gear 16. The ring gear 16 is joined to a rotatably mounted differential casing 18 which includes a pair of side gears 20 and 22 rotatably mounted therein and a plurality of pinions 24 which are in meshing engagement with the side gears 20, 22. The side gears 20, 22 are capable of providing differential power respectively to a pair of axle shafts 26 and 28 in a manner which is well known in the vehicular drive art.

Including only the features of the invention as described thus far, the differential 10 would receive input power from the shaft 12 and provide an output power to the axle shafts 26, 28 for efficient operation as the vehicle travels in a curved path. For example, if the vehicle were turning to the right, the wheel at the left on the axle shaft 26 would experience a higher r.p.m. than the right wheel on axle shaft 28. However, as mentioned hereinabove, while this differentiation is basically attractive, it can produce problems with properly propelling the vehicle if either wheel is under a no traction, slipped condition. In this situation, for example, if the left wheel on axle shaft 26 lost traction on ice or mud, the power to the input shaft 12 would not be capable of being applied to a better road surface at the right wheel to propel the vehicle. The slipping, rapidly spinning axle shaft 26 would effectively prevent any power from being applied to the axle shaft 28 even though it might be under a traction condition and would otherwise be able to propel the vehicle.

Accordingly, it is the purpose of the limited slip differential 10 to prevent such a condition by including a means for preventing differential action when either wheel experiences a critical loss of traction. Although it is well known that a limited slip differential can be provided by including means for preventing relative rotation between the differential casing and one of the side gears, the means for sensing such a condition and the particular means for preventing the relative rotation have varied in the prior art with various results.

In the preferred limited slip differential 10, the side gear 22 is provided an extension 30 having a splined outer region for the receipt of a clutch plate 32 thereon. The clutch plate 32 is therefore capable of rotating with the side gear 22 and includes a frusto-conical clutch surface 34 capable of being frictionally engaged to produce a braking force on the side gear 22. The differential casing 18 includes an extended portion 36 having an interior sleeve portion 38 which is coaxially aligned with and encircles the axle shaft 28. A clutch ring 40 is generally mounted on the sleeve 38 for rotation with the differential casing 18 and is capable of axial movement between an engaged position toward the side gear 22 and a non-engaged position away from the side gear 22. In the engaged position, the clutch ring 40 will produce frictional engagement with the clutch plate 32 of the side gear 22 as a mating surface 42 is brought into contact with the frusto-conical clutch surface 34. However, as seen in FIG. 1, the clutch ring 40 is in the non-engaged position which is axially separated from the clutch plate 32. There is included means for biasing the clutch ring 40 to the non-engaged position in the form of a spring 44 anchored to the sleeve 38 acting thereon.

The differential casing 18 also includes on the sleeve 38 thereof a cam ring 46 which is axially adjacent the clutch ring 40. The cam ring 46 includes a splined interior cylindrical surface which is rigidly received on a splined area 48 of the sleeve 38. Consequently, the cam ring 46 will rotate with the remainder of the differential casing 18 without any relative axial movement while the clutch ring 40 is only closely received about the splined area 48 to be capable of some relative rotation and axial movement thereon. It will be seen that the cam ring 46 could be integrally formed with the remainder of the differential casing 18 but is formed separately to facilitate assembly.

Also received about the sleeve 38 of the differential casing 18 is an inertial ring 50. The inertial ring 50 includes an interior cylindrical surface which is closely received about an exterior cylindrical surface of the sleeve 38 to allow some circumferential movement of the inertial ring 50 relative to the differential casing 18. Although some circumferential movement is possible, the mounting of the inertial ring 50 between the rigidly mounted cam ring and the remainder of the extended portion 36 prevents any axial movement of the inertial ring 50.

Figure 2:
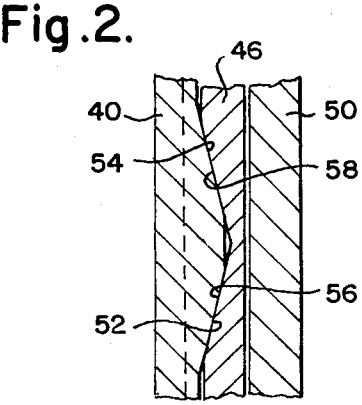
FIG. 2 is a view as seen along line 2—2 of FIG. 1.
Figure 3:
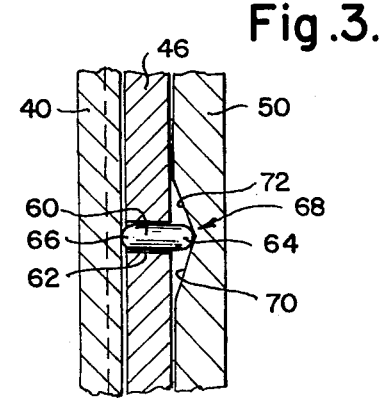
FIG. 3 is a view as seen along line 3—3 of FIG. 1.

For a better understanding of the physical relationships among the clutch ring 40, the cam ring 46 and the inertial ring 50, the views shown in FIGS. 2 and 3 are provided. Specifically, the view shown in FIG. 2 includes the clutch ring 40 in the non-engaged position to be closely received against the cam ring 46. The clutch ring 40 includes, in the limited portion shown in FIG. 2, a pair of camming surfaces 52, 54 which are closely received against matching camming surfaces 56, 58 of the cam ring 46. It can now be seen why the clutch ring 40 has been described as being "generally" mounted for rotation with the differential casing 18. As seen in FIG. 2, with the clutch ring 40 being held by the biasing of spring 44 against the cam ring 46, the clutch ring 40 will directly rotate with the differential casing 18. However, if the clutch ring 40 is caused to be moved axially from the non-engaged position of FIG. 2 to an engaged position at the left, the camming surfaces 52, 56 and 54, 58 will be sufficiently separated to allow some relative rotational movement between the clutch ring 40 and the cam ring 46. However, as will be made clear in the detailed discussion hereinbelow, the axial separation of the clutch ring 40 from the cam ring 46 at the engaged position will be insufficient to allow free rotation of the clutch ring 40 relative the cam ring 46 because subsequent contact between the camming surfaces 52, 56 or the camming surfaces 54, 58 will limit the relative rotation therebetween.

As seen in FIG. 3, another circumferential section of the clutch ring 40, cam ring 56 and the inertial ring 50 is seen to include a thrust pin 60. The thrust pin 60 is received within an axially extending hole 62 in the cam ring 46 and is, therefore, mounted to rotate with the differential casing 18. However, the thrust pin 60 is capable of axial movement within the hole 62 and includes a first end 64 in contact with the inertial ring 50 and a second end 66 in contact with the clutch ring 40. Specifically, the inertial pin 60 is shown to be located in a position axially to the right within a cam notch 68 in the radial surface of the inertial ring 50. The cam notch 68 includes a pair of cam surfaces 70 and 72 which are capable of acting on the first end 64 of the thrust pin 60 if there is any circumferential movement of the inertial ring 50 relative to the cam ring 46. However, as shown in FIG. 3, the biasing on the clutch ring 40 causes the clutch ring 40 to act on the second end 66 of the thrust pin 60 to locate the thrust pin 60 in the cam notch 68 at the base thereof to generally restrict circumferential movement of the inertial ring 50 relative to the cam ring 46.

As thus described, the portions of the clutch ring 40, cam ring 46 and the inertial ring 50 which are shown in FIGS. 2 and 3 are in fact only one of three such portions which are provided to the preferred clutch ring 40, cam ring 46 and inertial ring 50. In other words, in the preferred limited slip differential 10 there are three evenly spaced pairs of camming surfaces 52, 54 for the clutch ring 40 and three evenly spaced camming surfaces 56, 58 for the cam ring 56. Similarly, between each of the three portions shown in FIG. 2 are three identical portions as shown in FIG. 3. Accordingly, there are in the preferred limited slip differential 10 three such thrust pins 60 which are capable of acting on three cam notches 68 in the inertial ring 50.

Having explained the general physical relationships among the various components of the limited slip differential 10, it is appropriate to demonstrate the operation of the various components when the limited slip differential 10 is subjected to an operating condition which exists when one of the wheels is in a no traction or slipping condition. For this purpose, FIGS. 4–12 are provided and basically include a reproduction of the portions shown in FIGS. 2 and 3 with the addition of the clutch plate 32 of the side gear 22. To provide a better understanding of the relative rotation of the various components, the Figures will include direction arrows at the upper portion to show the relative rotational speed of each component. Although the relative rotational speed is shown in this manner, it should be understood that frequent reference will be made to the acceleration of one or another of the components and that, in fact, the acceleration is a significant feature determining the overall operation of the limited slip differential 10.

As seen in FIG. 4, the differential is operating in a forward direction and the components shown therein are all rotating at approximately the same rotational speed. The biasing provided by the spring 44 as indicated by the arrow B is acting on the clutch ring 40 to keep it in the non-engaged position separated from the clutch plate 32. With the clutch ring 40 held in the non-engaged position by the biasing of the spring 44, the thrust pin 60 is also moved to the right and is fully received within the cam notch 68 of the inertial ring 50 so that the inertial ring 50 is being carried with the cam ring 46 with no relative rotational movement therebetween. The side gear 22 and the clutch plate 32 (as well as the side gear 20) would be expected to frequently rotate at speeds different from the common rotational speed experienced by the clutch ring 40, cam ring 46 and inertial ring 50 as long as normal differentiation occurred without either wheel being operated under a loss of traction condition.

However, in FIG. 5, excessive slippage of the left wheel would cause rapid acceleration of the side gear 20. As a result, the differential casing 18 will also experience a rapid acceleration even as the loss of power to the side gear 22 causes it to rapidly decelerate. When the acceleration of the cam ring 46 exceeds a predetermined rate of acceleration, the mass of the inertial ring 50 is sufficient to resist the acceleration of the differential casing 18. With the inertial ring 50 tending to remain at the same rotational speed rather than the greater speed experienced by the cam ring 46, the inertial ring will tend to move circumferentially relative thereto to produce an inertial force I at the cam surface 72 to cause axial movement of the thrust pin 60. The thrust pin 60 will then apply an engaging force E to the clutch ring 40 which is sufficient to overcome the biasing force B to initiate movement of the clutch ring 40 from the non-engaged position toward the engaged position. With the clutch ring 40 no longer having its camming surfaces 52, 54 in direct contact with the camming surfaces 56, 58 of the cam ring, there is the possibility that its inertia may allow some difference in relative rotational speed between the clutch ring 40 and the cam ring 46. However, this difference in rotational speed will be instantaneous and, of course, as mentioned hereinabove, will be limited by the possibility of contact being re-established between the camming surfaces 52, 56 or the camming surfaces 54, 58.

As seen in FIG. 6, the circumferential movement of the inertial ring 50 has been sufficient to cause axial movement of the thrust pin 60 to the left sufficiently to cause the clutch ring 40 to be located at the engaged position. At the engaged position, frictional contact is produced between the mating surface 42 thereof and the frusto-concial clutch surface 34 of the clutch plate 32. As frictional contact, in the form of a resistive force indicated by the arrow R1, is produced between the clutch plate 32 and the clutch ring 40, the relative rotation therebetween will cease and the clutch ring 40 will be caused to move circumferentially relative to the cam ring 46 to bring the camming surface 52 into direct contact with the camming surface 56. When the camming surface 52 and the camming surface 56 are in contact, the differential casing 18 will apply a thrust force, as indicated by the arrow T1, to the clutch ring 40 in opposition to the resistive force R1. The thrust being applied to the clutch ring 40 will cause the clutch plate 32 and thus the side gear 22 to be brought up to speed with the differential casing 18.

The limited slip differential 10 will operate in this manner with both side gears 20 and 22 being rotated at the same rate as the differential casing 18 until there is a relaxation of the torque on the clutch ring 40 as either or both of the forces R1 and T1 are reduced to zero. Obviously, there would be a relaxation of the torque on the clutch ring 40 if the left wheel were to regain traction and receive more of the power than the right wheel; if the righ wheel were to lose traction to a greater degree than the left wheel; or if the torque being applied to the differential casing were eliminated as might occur if the vehicle is stopped or operating in a reverse direction. However, the torque may also be sufficiently relaxed by releasing the throttle or utilizing the clutch during the shifting of gears.

It should be noted that when the limited slip differential 10 is operating in a condition as shown in FIG. 6, the actual location of the inertial ring 50 relative to the cam ring 46 is not important. It would be possible for the inertial ring 50 to be brought up to speed with the cam ring 46 or even to be circumferentially advanced of the cam ring 46 if, for example, the vehicle is slowing down but still maintaining torque on the clutch ring 40. Once the clutch ring 40 is in the engaged position and torque is being maintained thereon, the inertial ring 50 is free to circumferentially move relative to the cam ring 46 within the limits imposed by the inclusion of the thrust pin 60 within the cam notch 68. Similarly, the thrust pin 60 would be free to axially move if allowed by the particular position of the inertial ring since a biasing force is no longer being applied thereto.

However, once thrust is no longer being applied to the cam ring 46, the biasing force B will again be effectively applied to the clutch ring 40 to cause it to be returned to its non-engaged position as shown in FIG. 7. Additionally, the biasing on the clutch ring 40 will cause the clutch ring 40 to act on the thrust pin 60 to circumferentially orient the inertial ring 50 for corresponding rotation with the cam ring 46 as the first end 64 is fully inserted into the cam notch 68. Therefore, as shown in FIG. 7, the limited slip differential 10 will return to normal rotation in a forward direction in the same manner as was demonstrated in FIG. 4.

However, as seen in FIG. 8, if the right wheel were to experience a non-traction, slipped condition, the side gear 22 would be caused to rapidly accelerate to again cause sufficient acceleration of the differential casing 18 above the predetermined rate to cause the circumferential movement of the inertial ring 50 relative thereto. Accordingly, the thrust pin 60 will again supply an engaging force E to the clutch ring 40 to cause it to be moved against the biasing force B from the non-engaged position toward the clutch plate 32.

However, when there is contact produced between the clutch ring 40 and the clutch plate 32, the frictional engagement therebetween will now cause the clutch ring 40 to be advanced relative to the cam ring 46 as shown in FIG. 9. The operation of the differential will be such that the thrust T2 created by the friction force of the clutch plate 32 on the clutch ring 40 will be resisted by the slower moving cam ring 46. The cam ring 46 will apply a resistive force R2 to the clutch ring 40 as the camming surfaces 54 and 58 are brought into locking engagement. As was the case for the operation shown in FIG. 6, the side gears and the differential casing will continue to rotate at the same rate until the torque applied to the clutch ring 40 is released. Similarly, as long as the torque is being applied to the clutch ring 40, the inertial ring 50 and the thrust pin 60 will be capable of limited movement relative to the cam ring 46.

As seen in FIGS. 10–12, the limited slip differential 10 will also function in a similar manner if the differential casing 18 is being rotated in the opposite direction as when the vehicle is being moved in reverse. Again, in FIG. 10, the biasing force B will maintain the clutch ring 40 in a non-engaged position as long as the differential casing does not exceed the predetermined rate of acceleration. As seen in FIG. 11, the left wheel, that associated with the side gear 20, is in a non-traction condition and has rapidly accelerated causing the cam ring 46 to rapidly accelerate even though there is rapid deceleration of the side gear 22. As before, the inertial ring 50 has sufficient mass to resist the rapid acceleration of the cam ring 46 and causes an intertial force I to be applied to the thrust pin 60 as the cam surface 70 acts thereon. The thrust pin 60 again applies sufficient engaging force E to resist the biasing force B on the clutch ring 40. As seen in FIG. 12, the clutch ring 40 is brought into contact with the slower moving clutch plate 32 of the side gear 22 so that a resisting force R3 is applied thereto. As the force R3 is applied to the clutch ring 40, the camming surface 54 is brought into locking engagement with the camming surface 58 to cause the differential casing 18 to apply a force T3 thereto tending to produce an equal rotational speed for the two side gears and the differential casing.

As thus explained, the preferred limited slip differential 10 will properly function in either direction of rotation, whether the vehicle is moving in a forward direction or a reverse direction, and when either of the wheels associated with the axle shafts thereof is found to be in a slipped condition to cause acceleration of the differential casing 18 above a predetermined rate. When the clutch ring 40 is moved to the engaged position, the preferred differential 10 includes the clutch plate 32 having a frusto-conical clutch surface 34 which will tend to be in locking engagement with the mating surface 42 and the clutch ring 40 whenever there is sufficient axial force applied therebetween. Accordingly, the biasing created by the spring 44 will not prematurely disengage the clutch ring 40 from the clutch plate 32 as long as the locking taper of the matching cams 52, 56 and 54, 58 between the clutch ring 40 and the cam ring 46 exists.

To provide this locking type of taper to insure the operation of the limited slip differential 10 as described hereinabove, the coefficient of friction of the materials to be utilized in the clutch plate, clutch ring and cam ring must be considered along with the interference angles selected for the surfaces therebetween. It has been found that for various steels of the type frequently used in differentials the conical angle of the frusto-conical surface 34 should be selected to be about of 24 degrees so that the surface would intersect the axis of the differential casing and the axle shafts at an angle of about 12 degrees for such a locking condition to occur. Similarly, the value of 12 degrees is utilized for the camming surfaces 52, 56 and 54, 58 as the angle is measured from a plane which is perpendicular to the axis of rotation of the differential casing 18. When these angles are selected, the force being created at either side of the clutch ring 40 will tend to increase the frictional resistance at the other side of the clutch ring 40 so that once there is a proper thrust applied to the clutch ring 40 the frictional contact at either side will be maintained until the thrust thereon is totally relaxed.

However, the means for creating a braking force between one of the side gears and the differential casing need not be limited to a frusto-conical clutch configuration. It would be possible to include in the invention a different type of braking contact between the side gear and the differential casing, such as might occur through the use of a plurality of alternating friction discs as is well known in the prior art. However, such a configuration would not result in locking contact between the clutch plate 40 and the side gear 22 and would not automatically prevent relative rotation therebetween under axial loading. Nevertheless, it would be possible for sufficient braking force to be created therebetween which would significantly reduce the relative rotation of the elements to still effectively prevent the undesired slipped condition.

Although a thrust pin configuration is utilized to transfer force created by the inertial ring 50 to the clutch ring 40, there might be any number of physical configurations which could be utilized to produce similar results while still falling within the scope of the invention as claimed. For example, although the preferred inertial ring 50 is prevented from moving axially, it would be possible to allow axial movement thereof toward the clutch ring 40 by there being provided a notch in the radial surface at the opposite side from the location of the present notch 68. The new notch would normally receive therein axially extending camming surfaces on the extension 36 of the differential casing 18. If the inertial ring were to be biased in a direction away from the clutch ring, rapid acceleration of the differential casing could again cause circumferential movement of the inertial ring and would, because of the camming between the inertial ring and the extension of the differential casing created by the new notch, cause axial movement of the inertial ring toward the clutch ring 40. An axially extending extension of the inertial ring toward a radial face of the clutch ring would then be capable of making contact with the clutch ring to cause it to be moved against biasing into the engaged position. In this manner, the thrust pin could be eliminated. It should also be clear that in this or another alternative configuration, it would be possible to provide a different form of biasing to resist the circumferential movement of the inertial ring which would be independent of the biasing force created on the clutch ring 40 by the spring 44. Consequently, it can be seen that there may be any number of alternative means for providing the limited slip differential of the present invention without departing from the invention as claimed.

I claim:
1. A limited slip differential comprising:
   a rotatably mounted differential casing;
   a pair of side gears rotatably mounted in said differential casing;
   a plurality of planetary pinions rotatably mounted on said differential casing an in meshing engagement with said side gears;
   a clutch ring being generally mounted for rotation with said differential casing and capable of axial movement between an engaged position toward one of said side gears to produce a braking force therebetween and a non-engaged position;

means for biasing said clutch ring toward said non-engaged position;

an inertial ring mounted for rotation with said differential casing and capable of circumferential movement relative thereto between a neutral position and a first actuated position;

means for resisting said circumferential movement of said inertial ring from said neutral position during rotation of said differential casing in a first direction below a predetermined rate of acceleration thereof at least when said clutch ring is in said non-engaged position;

said differential casing exceeding said predetermined rate of acceleration when either of said side gears is caused to accelerate under a slipped condition;

said inertial ring having sufficient mass resisting said acceleration of said differential casing to overcome said means for resisting said circumferential movement when said differential casing exceeds said predetermined rate of acceleration to be relocated relative thereto at said first actuated position;

means for axially moving said clutch ring to said engaged position when said inertial ring is relocated at said first actuated position;

said clutch ring being in said engaged position producing said braking force between said clutch ring and said one side gear to cause rotation of said clutch ring with said one side gear;

said clutch ring and said differential casing having camming surfaces thereon which are brought into contact by said rotation of said clutch ring with said one side gear, said camming surfaces preventing further relative rotation of said clutch ring and said differential casing and forcing said clutch ring toward said engaged position against said biasing as long as thrust on said differential casing is transmitted to said one side gear through said clutch ring; and said means for axially moving said clutch ring to said engaged position including an axially aligned thrust pin means which is carried by said differential casing between said clutch ring and said inertial ring and is capable of axial movement, said thrust pin means having a first end in alignment with a cam surface of said inertial ring and a second end contacting said clutch ring, said first end being moved axially toward said clutch ring by said cam surface as said inertial ring moves from said neutral position to said first actuated position to cause said second end to move said clutch ring from said non-engaged position to said engaged position.

2. The limited slip differential as set forth in claim 1, wherein said means for resisting said circumferential movement of said inertial ring relative to said differential casing includes said means for biasing said clutch ring causing said clutch ring to act on said second end of said thrust pin means as said first end of said thrust pin means acts on said cam surface of said inertial ring.

* * * * *